(12) United States Patent
Tomatis

(10) Patent No.: US 9,894,919 B2
(45) Date of Patent: Feb. 20, 2018

(54) MOULDING MACHINE FOR PRODUCTION OF PASTA-FILATA CHEESE STICKS

(71) Applicant: CMT COSTRUZIONI MECCANICHE E TECNOLOGIA SPA, Peveragno (IT)

(72) Inventor: Stefano Tomatis, Peveragno (IT)

(73) Assignee: CMT COSTRUZIONI MECCANICHE E TECNOLOGIA SPA, Peveragno (IT)

( * ) Notice: Subject to any disclaimer, the term of this patent is extended or adjusted under 35 U.S.C. 154(b) by 309 days.

(21) Appl. No.: 14/663,145

(22) Filed: Mar. 19, 2015

(65) Prior Publication Data
US 2015/0264961 A1    Sep. 24, 2015

(30) Foreign Application Priority Data
Mar. 19, 2014 (IT) .............................. TO2014A0225

(51) Int. Cl.
| | | |
|---|---|---|
| *A23P 30/20* | (2016.01) | |
| *A23L 1/00* | (2006.01) | |
| *A01J 25/00* | (2006.01) | |
| *A01J 25/12* | (2006.01) | |

(52) U.S. Cl.
CPC ........... *A23L 1/0076* (2013.01); *A01J 25/008* (2013.01); *A01J 25/123* (2013.01); *A23P 30/20* (2016.08)

(58) Field of Classification Search
CPC ........ A23L 1/0076; A23P 30/10; A23P 10/28; A23P 30/20; A01J 25/008; A01J 25/123; B29C 45/12; B29C 45/125; B29C 45/1761; B29C 45/1773; B29C 45/261; B29C 45/32; B29C 45/40; B29C 45/4005; B29C 45/401; B29C 45/70; B29C 43/58; B29C 47/0016; B29C 2045/2872; B29C 2945/76598
USPC ....... 425/149, 150, 542, 546, 556, 562, 572, 425/575, 577, 581, 588, 589, 593, 594; 426/516, 276, 448, 442, 447, 451, 454, 426/455; 264/645, 297.2, 297.3, 328.1, 264/328.2, 328.8
See application file for complete search history.

(56) References Cited

U.S. PATENT DOCUMENTS

| | | |
|---|---|---|
| 4,112,835 A | 9/1978 | Mongiello |
| 4,235,578 A * | 11/1980 | Cosmi ..................... A01J 25/12 249/134 |
| 4,613,294 A | 9/1986 | Rose |

(Continued)

OTHER PUBLICATIONS

Italian Search Report for TO20140225 dated Nov. 13, 2014.

*Primary Examiner* — Matthew Daniels
*Assistant Examiner* — Leith S Shafi
(74) *Attorney, Agent, or Firm* — Koppel, Patrick, Heybl & Philpott

(57) ABSTRACT

A molding unit comprises a chamber supplied with pasta-filata and having outlets A mold has two rows of channels opening on a first surface of the mold facing downwards and arranged adjacent to the outlets. Driving elements drive the mold with reciprocating motion between a first position and a second position. A consolidation tub is arranged below the molding unit. A first chute and a second chute are arranged between the molding unit and the consolidation tub. Each chute has an inlet end substantially parallel to the plane defined by the axes of the channels, and an outlet end slanting with respect to the horizontal plane by a delivery angle in the range 0° to 45°.

9 Claims, 4 Drawing Sheets

(56) References Cited

U.S. PATENT DOCUMENTS

| | | | | |
|---|---|---|---|---|
| 5,037,597 A | * | 8/1991 | McGinley | B29C 66/8322 |
| | | | | 264/238 |
| 5,881,639 A | * | 3/1999 | Nesheim | A01J 25/12 |
| | | | | 425/149 |
| 2012/0107470 A1 | * | 5/2012 | Nesheim | A01J 25/12 |
| | | | | 426/389 |
| 2013/0209641 A1 | * | 8/2013 | Kot | A47J 37/06 |
| | | | | 426/516 |

* cited by examiner

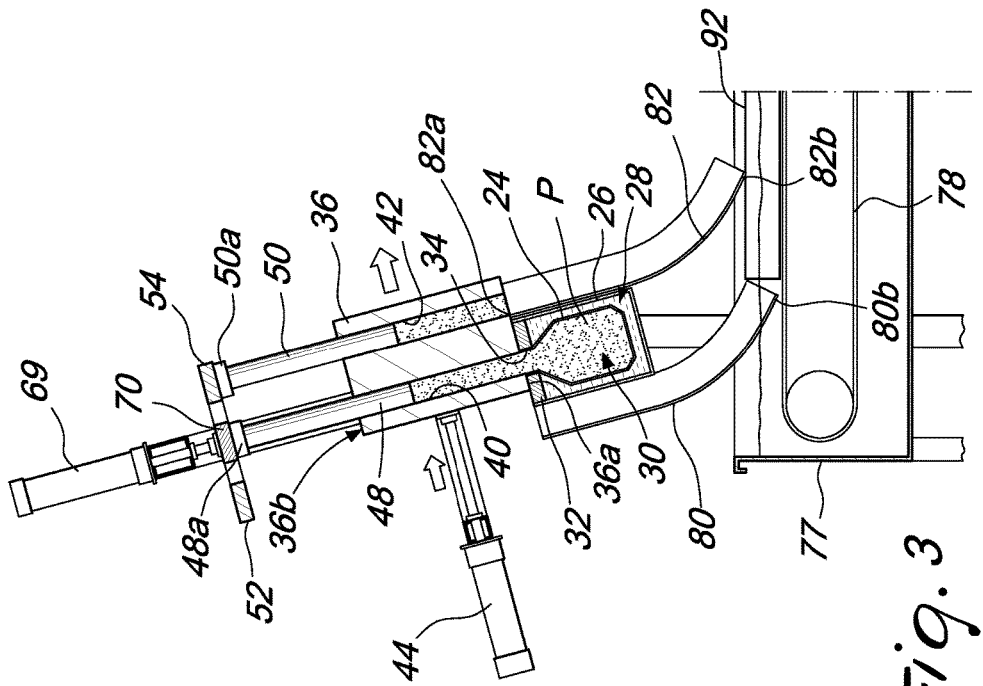
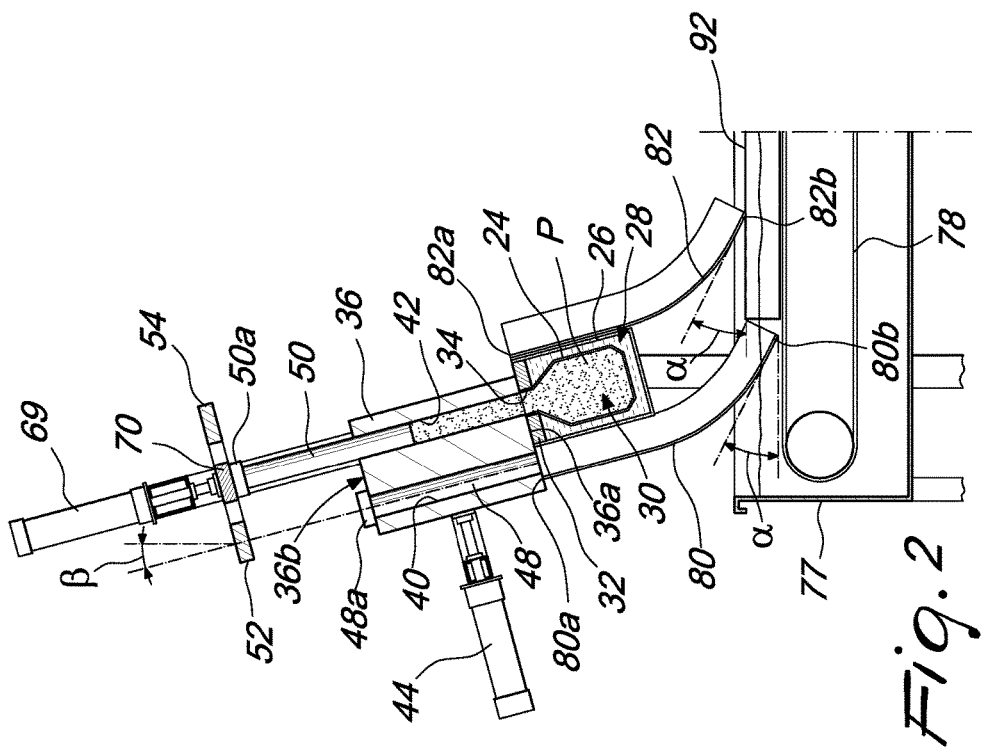

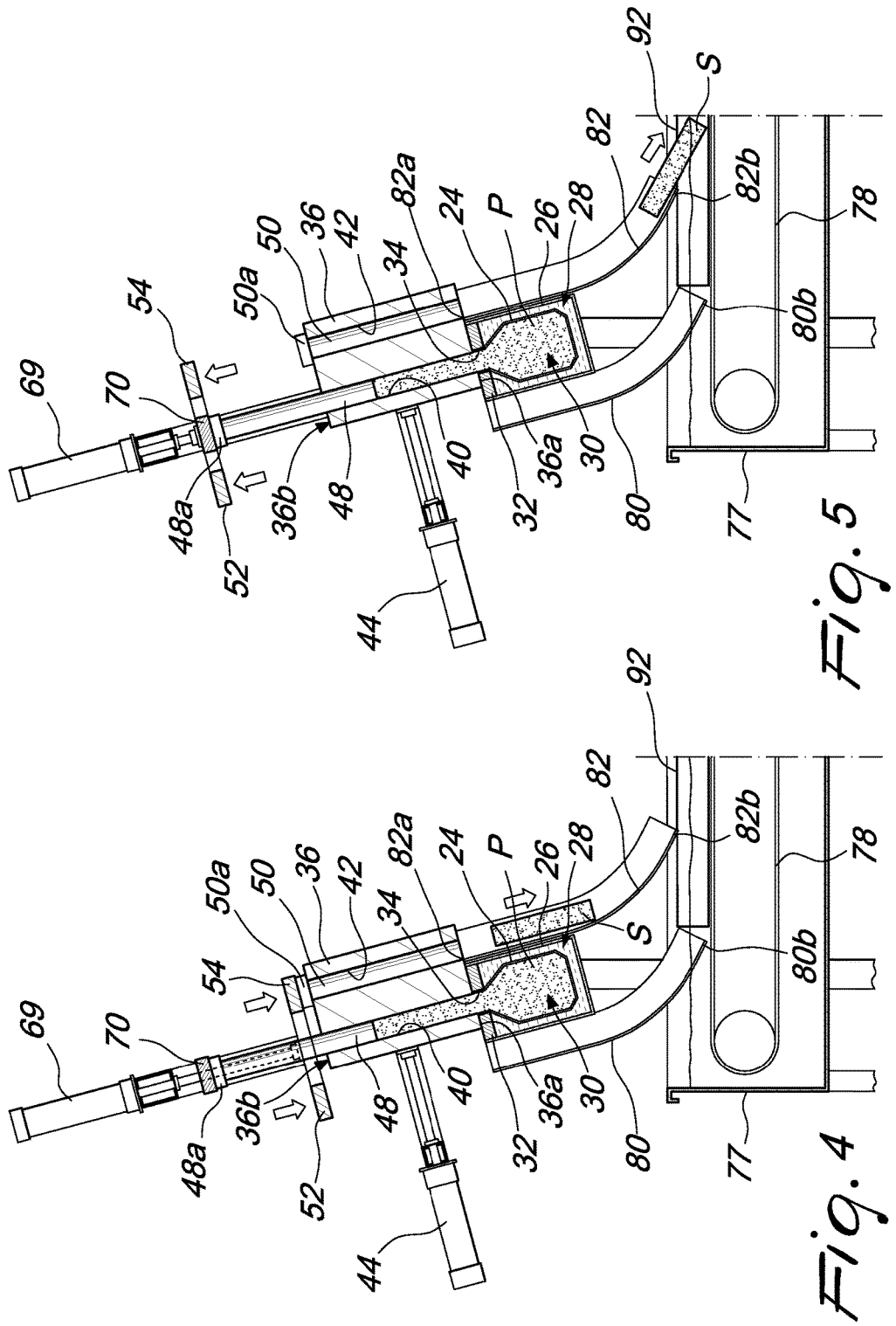

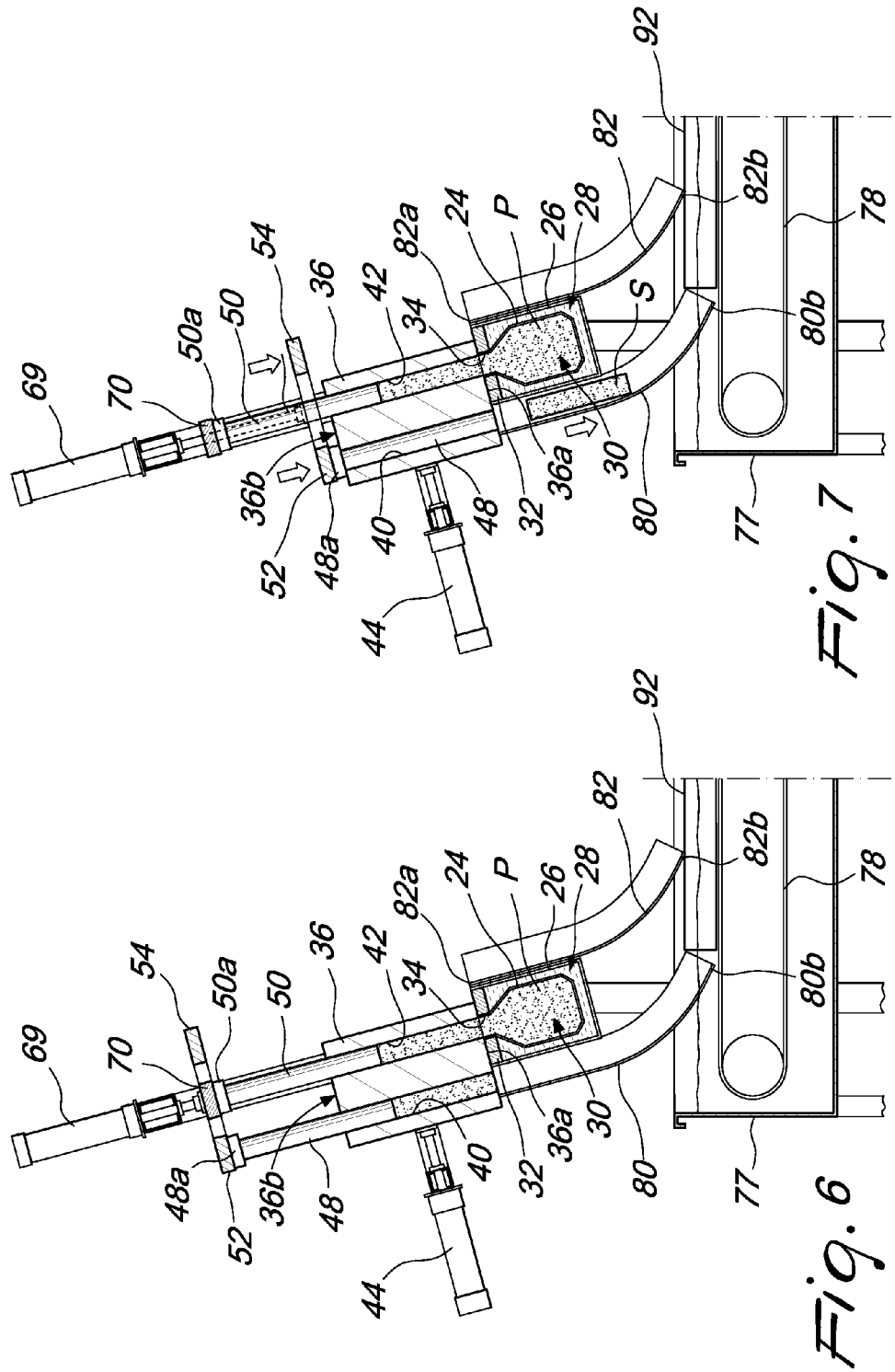

MOULDING MACHINE FOR PRODUCTION OF PASTA-FILATA CHEESE STICKS

The present invention relates to a moulding machine for production of pasta-filata cheese sticks.

BACKGROUND OF THE INVENTION

It is known to form sticks of pasta-filata cheese by a mould having a plurality of vertical moulding channels open at their lower ends, into which hot pasta-filata is fed typically at a temperature of about 62-63° C. The pasta-filata is then unloaded from the open, lower ends of the channels in the shape of sticks, which fall into a consolidation tub filled with cold water, where they are cooled and consolidated.

A drawback of known forming machines is that, especially in the production of sticks which are relatively small in diameter, e.g., less than 25 mm, the sticks are liable to bend and deform as they impact on the surface of the water in the consolidation tub. This is because the sticks discharged from the mould still have a very soft and flexible plastic consistency, due to the high temperature of the pasta-filata of which they are made.

This circumstance not only is undesirable from the aesthetic point of view, because the finished product is desired to have a regular, rectilinear shape, but also generates complications in relation to the packaging of the sticks, which are normally wrapped individually.

SUMMARY OF THE INVENTION

Therefore, it is a main object of the present invention to provide a moulding machine which is capable to form pasta-filata cheese sticks having a regular, rectilinear shape, and which, at the same time, has a high productivity.

It is another object of the invention to provide a moulding machine capable of producing sticks which are constant in weight.

The above objects and other advantages, which will become apparent from the following description, are achieved by the moulding machine having the features recited in claim 1, while the dependent claims state other advantageous, though secondary features of the invention.

BRIEF DESCRIPTION OF THE DRAWINGS

The invention will be now described in more detail with reference to a preferred, non-exclusive embodiment, shown by way of non-limiting example in the attached drawings, wherein:

FIGS. 2 to 7 are view in longitudinal cross-section of the moulding machine of FIG. 1 in six respective, successive operative configurations.

DESCRIPTION OF THE PREFERRED EMBODIMENTS

Figure 1:
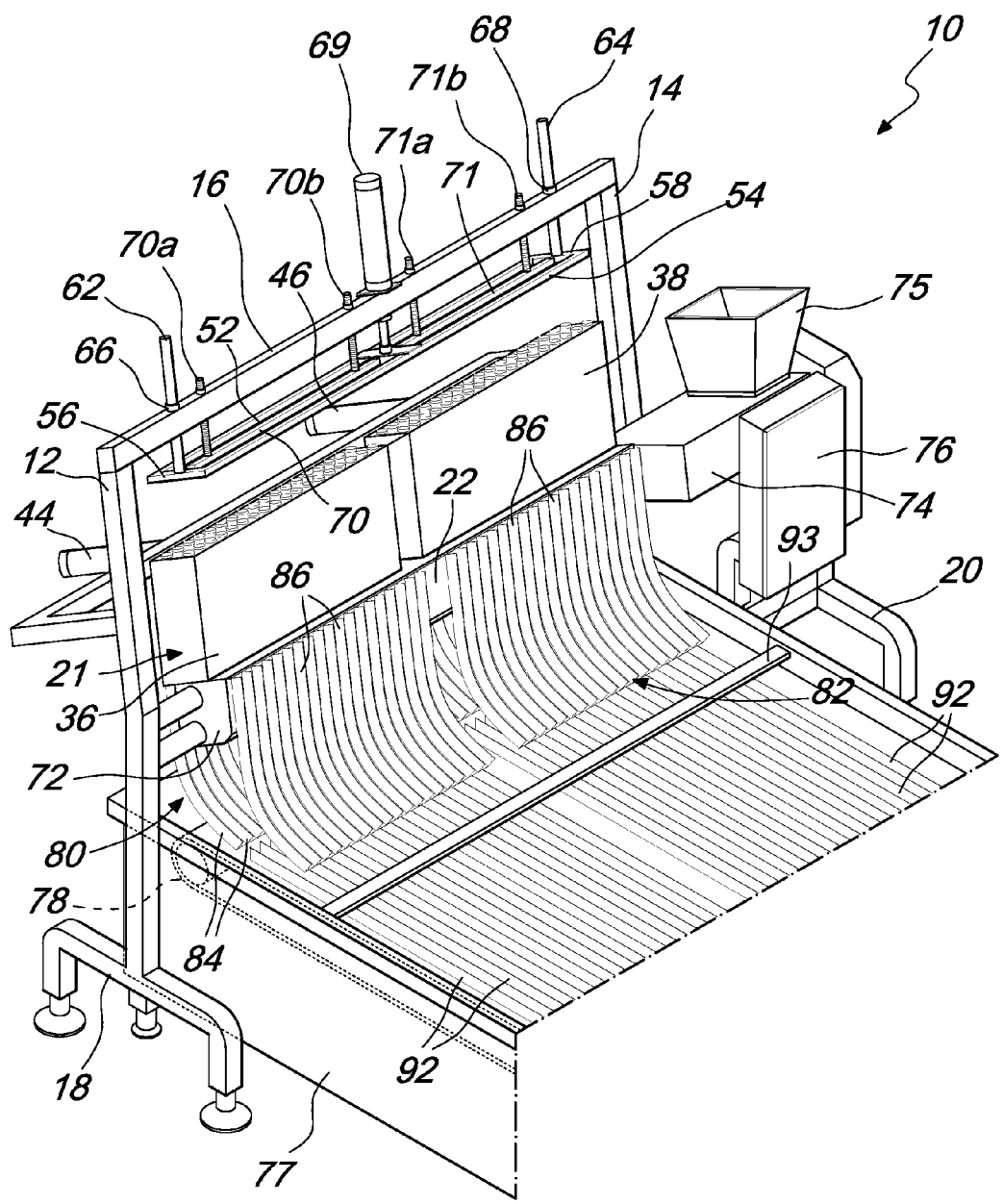
FIG. 1 is a plan view of the moulding machine according to the invention.

With reference to the above Figures, a moulding machine 10 comprises a portal frame provided with two uprights 12, 14 interconnected at their upper ends by a cross-member 16. Frame 10 lies on the ground via two feet 18, 20 welded to the lower ends of uprights 12, 14.

A moulding unit 21 is supported between uprights 12, 14. Moulding unit 21 comprises an U-shaped duct 22 which extends horizontally between uprights 12, 14 and is provided with an inner wall 24 and an outer wall 26 having a cavity 28 defined therebetween, into which hot water is fed. A chamber 30 is internally defined by inner wall 24 of duct 22, in which pasta-filata is fed, as will be described later.

Channel 22 is closed at the top by a plate 32, which seals cavity 28 and has outlets 34 which are arranged in-line and are open to chamber 30. With the embodiment described herein, the outlets consist of a row of equally-spaced holes 34, but could also consist of a single, elongated slot. In particular, as illustrated in FIG. 2, inner wall 24 of duct 22 is shaped in such a way as to converge like a funnel into the holes 34.

Two identical moulds 36, 38 in the shape of a parallelepiped are arranged side by side, with a first surface such as 36a facing downwards and placed adjacent to outer surface of plate 32. Each of the moulds has two parallel rows of channels 40, 42 extending from first surface 36a to an opposite, second surface 36b. The distance between the channels in each row is equal to the distance between the holes 34 on plate 32.

Moulds 36, 38 are driven with reciprocating motion in a direction perpendicular to the longitudinal extension of duct 22, by respective actuators 44, 46, so as to alternately align the channels 40 of one row and the channels 42 of the other row to holes 34.

The channels of the rows which are not aligned to holes 34 are open to the outside for discharge. In this regard, moulding unit 21 is provided with ejection means operated intermittently to eject the pasta-filata P from the channels open to the outside in the shape of sticks S.

The ejection means comprise ejection pistons 48, 50 which are slidably received within channels 40, 42. Each of pistons 48, 50 has an enlarged head 48a, 50a adapted to abut on second surface 36b of the mould. A pair of horizontal, parallel ejection crossbars 52, 54, which are interconnected at their ends by bars 56, 58, and are guided to translate in a direction parallel to the axes of channels 40, 42 by a pair of guide rods 62, 64 fixed to crossbars 56, 58. Guide rods 62, 64 are slidable within respective bushes 66, 68 fixed to cross-member 16, upon control of a further actuator 69 which is also fixed to cross-member 16. Ejection crossbars 52, 54 are spaced apart by a distance equal to twice the distance between the rows of channels 40, 42, and are arranged so that, when channels 40 of the first row are aligned to holes 34, pistons 50 in channels 42 of the second row are located along the path of second ejection crossbar 54. Vice versa, when channels 42 of the second row are aligned to holes 34, pistons 48 in channels 40 of the first row are located along the path of first ejection crossbar 52.

Two adjusting crossbars 70, 71 are centrally supported between expulsion bars 52, 54 to define the outer end-of-stroke for the pistons. Adjusting crossbars 70, 71 are connected to cross-member 16 by respective pairs of threaded rods 70a, 70b and 71a, 71b, which allow the distance of adjusting crossbars 70, 71 from second surface 36b of the moulds to be adjusted. Therefore, adjusting crossbars 70, 71 are always located along the path of the pistons received in the channels aligned to holes 34 (i.e., pistons 50 in FIG. 2 and pistons 48 in FIG. 3).

One end 22a of the duct is closed by a cover 72, while the opposite end has a feeding head 74 applied thereto, which is provided with a loading hopper 75 and with a wiring cabinet 76. In a way known per se, feeding head 74 feeds hot pasta-filata P into chamber 30 via a pair of counter-rotating motorized augers (not shown), and also circulates hot water (not shown) into cavity 28. A consolidation tub 77 filled with cold water is arranged below moulding unit 21 to receive the product output from moulding unit 21. In a manner known per se, consolidation tub 77 incorporates a motorized belt 78, which is immersed just below the surface of the water for carrying the product slowly towards an output end of the tub (not shown). While moving forward, the product is cooled and consolidated.

Two chutes, a rearmost one, 80, and a frontmost one, 82, are arranged between moulding unit 21 and consolidation tub 77, in order to collect the sticks discharged from the first row of channels 40 and the second row of channels 42 respectively, and to discharge them in a guided manner into consolidation tub 77; chutes 80, 82 have an input end which is substantially parallel to the plane defined by the axes of channels 40, 42, and an output end—located near the surface of the water in the consolidation tub—which is slanting by a delivery angle a in the range 0° to 45° with respect to the horizontal plane.

As shown in the Figures, with reference to the plane containing the axes of channels 40, 42, moulding unit 21 is advantageously inclined by a slope angle b in the range 0° to 45° with respect to the vertical axis, preferably about 20°.

In view of the inclination of moulding unit 21, chutes 80, 82 advantageously have a curved profile from their inlet ends 80a, 82a to their outlet ends 80b, 82b, so that the delivery angle falls in the range 0° to 30°, preferably about 20°.

Chutes 80, 82 are provided with a plurality of longitudinal dividers such as 84, 86, which define a series of passageways aligned and in equal number to channels 40, 42, in order to maintain the sticks delivered from the chutes aligned to each other.

Similarly, a series of longitudinal guides 92 aligned to dividers 84, 86 on chutes 80, 82 extend immediately above motorized belt 78, in order to guide the sticks delivered from the chutes also for a portion of their movement in the tub.

In operation, feeding head 74 feeds pasta-filata P into chamber 30 and circulates hot water into cavity 28 in order to maintain the pasta-filata at a temperature suitable for moulding, typically about 62-63° C. With the moulds in the initial position of FIG. 2, channels 42 of the second row are aligned to holes 34. In this configuration, the pasta-filata fed into chamber 30 passes through holes 34 in plate 32 and fills channels 42 of the second row, thereby causing the respective pistons 50 to move outwards and to abut on adjusting crossbar 70.

Now, moulds 36, 38 are driven by actuators 44, 46 to the position of FIG. 3, in which channels 40 of the first row are aligned to holes 34, while the pistons in channels 42 of the second row, which have just been filled, are located along the path of second ejection crossbar 54. During the translation of the moulds, the pasta-filata in channels 42 of the second row is separated from the pasta-filata in chamber 30 by shearing action between the outer surface of plate 32 and first surface 36a of mould 36. In this configuration, channels 40 of the first row are filled with pasta-filata P, whereby the respective pistons 48 move outwards and abut on adjusting crossbar 70.

Thereafter, pistons 50 of the first row are pushed into their respective channels 42 by second ejection crossbar 54, which is lowered upon control of actuator 69 (FIG. 4). Consequently, the pasta-filata introduced into channels 42 of the second row is discharged onto front chute 82 in the shape of sticks S.

Now, ejection crossbars 52, 54 are raised again (FIG. 5) and moulds 36, 38 are driven by actuators 44, 46 to the initial position (FIG. 6). Also in this case, during the translation of the moulds, the pasta-filata in channels 40 of the first row is separated from the pasta-filata in chamber 30 by shearing action between the outer surface of plate 32 and first surface 36a of mould 36. In this configuration, pistons 48 in channels 40 of the first row, which are now filled with pasta-filata, are located along the path of first ejection crossbar 52, while channels 42 of the second row, which have just been emptied, are aligned to holes 34 and are ready to be refilled.

While channels 42 of the second row are filled, pistons 48 of the first row are pushed into their respective channels 40 by first ejection crossbar 52, which is lowered again upon control of actuator 69 (FIG. 7), with consequent expulsion of the product in the shape of sticks. Then, the cycle is repeated. As the person skilled in the art will appreciate, chutes 80, 82 guide the sticks while falling into the consolidation tub 77, thereby reducing both the falling speed by friction and the angle of entry into the water. In this manner, the sticks are prevented from deforming by impact on the water surface.

Longitudinal dividers 84, 86 on the chutes and longitudinal guides 92, 94 in the tub maintain the sticks output from moulding unit 21 perfectly aligned and separated from each other.

A preferred embodiment of the invention has been described herein, but of course many changes may be made by the person skilled in the art within the scope of the claims. For example, although in the described embodiment moulding unit 21 is slanting by an angle b with respect to the vertical plane, it would also be possible to arrange the moulding unit vertically (b=0°) by increasing the curvature of the chutes. On the other hand, in the described embodiment chutes 80, 82 have a curved profile, so as to optimize the falling speed and the angle of entry into the water also in relation to the inclination of moulding unit 21. However, depending on the production parameters, e.g., the diameter of the sticks, in certain cases higher falling speed and larger delivery angles could be accepted. Therefore, satisfactory results could even be obtained with rectilinear chutes, provided that the moulding unit is sufficiently inclined. Furthermore, the machine of the described embodiment is provided with two moulds 36, 38 which are independently driven from each other. Of course, depending on the production requirements, the machine could also be equipped with a single mould, as well as with three, four or more moulds.

The disclosures in Italian Patent Application No. TO2014A00225 from which this application claims priority are incorporated herein by reference.

What is claimed is:

1. A moulding machine for production of pasta-filata cheese sticks, comprising:
   a moulding unit comprising:
      a chamber, which is supplied with pasta-filata and has outlets arranged in line and facing upwards,
      at least one mould, which has two rows of channels opening on a first surface of the mould facing downwards and arranged adjacent to said outlets, and
      driving means, which are adapted to drive said mould with reciprocating motion between a first position, in which the channels of a first one of said rows are aligned to said outlets to be filled with pasta-filata, while the channels of the second one of said rows are open to the outside for discharge, and a second position in which the channels of the second one of said rows are aligned to said outlets to be filled with pasta-filata while the channels of the first one of said rows are open to the outside for discharge, a consolidation tub arranged below said moulding unit, and a first chute and a second chute, which are arranged between said moulding unit and said consolidation tub for receiving pasta-filata in the shape of sticks from the channels of the first row and the channels of the second row respectively, and for unloading said sticks into the consolidation tub, each of said chutes having an inlet end substantially parallel to the plane defined by the axes of said channels, and an outlet end slanting with respect to the horizontal plane by a delivery angle in the range 0° to 45°, wherein said chutes each have a plurality of longitudinal dividers defining a plurality of corridors aligned and equal in number to the channels of each row.

2. The moulding machine of claim 1, wherein said moulding unit, having reference to the plane defined by the axes of said channels, is slanting with respect to the vertical plane by a slope angle in the range 0° to 45°.

3. The moulding machine of claim 2, wherein said slope angle (b) is substantially 20°.

4. The moulding machine of claim 1, wherein said chutes have a curved profile from said inlet end to said outlet end such that said delivery angle is in the range 0° to 30°.

5. The moulding machine of claim 1, wherein said delivery angle is substantially 20°.

6. The moulding machine of claim 1, wherein said consolidation tub is provided with longitudinal guides aligned to said longitudinal dividers on the chutes for guiding the sticks while moving forward in the consolidation tub.

7. The moulding machine of claim 1, further comprising ejection means adapted to eject pasta-filata in the shape of sticks from the channels open to the outside.

8. The moulding machine of claim 7, wherein said channels are also open on a second surface of the mould facing away from said first surface, and said ejection means comprise pistons slidably received within the channels, all the pistons received within the channels open to the outside being simoultaneously engageable by a respective ejection crossbar which is operatively connected to actuation means for pushing the pistons into the respective channels and discharge the sticks.

9. The moulding machine of claim 8, further comprising an adjusting crossbar, against which all the pistons received in the channels aligned to the outlets are adapted to abut as the channels are filled with pasta-filata, said adjusting crossbar being provided with adjusting means for varying the distance of the adjusting crossbar from said second surface and, consequently, the length of the sticks.

* * * * *